Patented Oct. 20, 1953

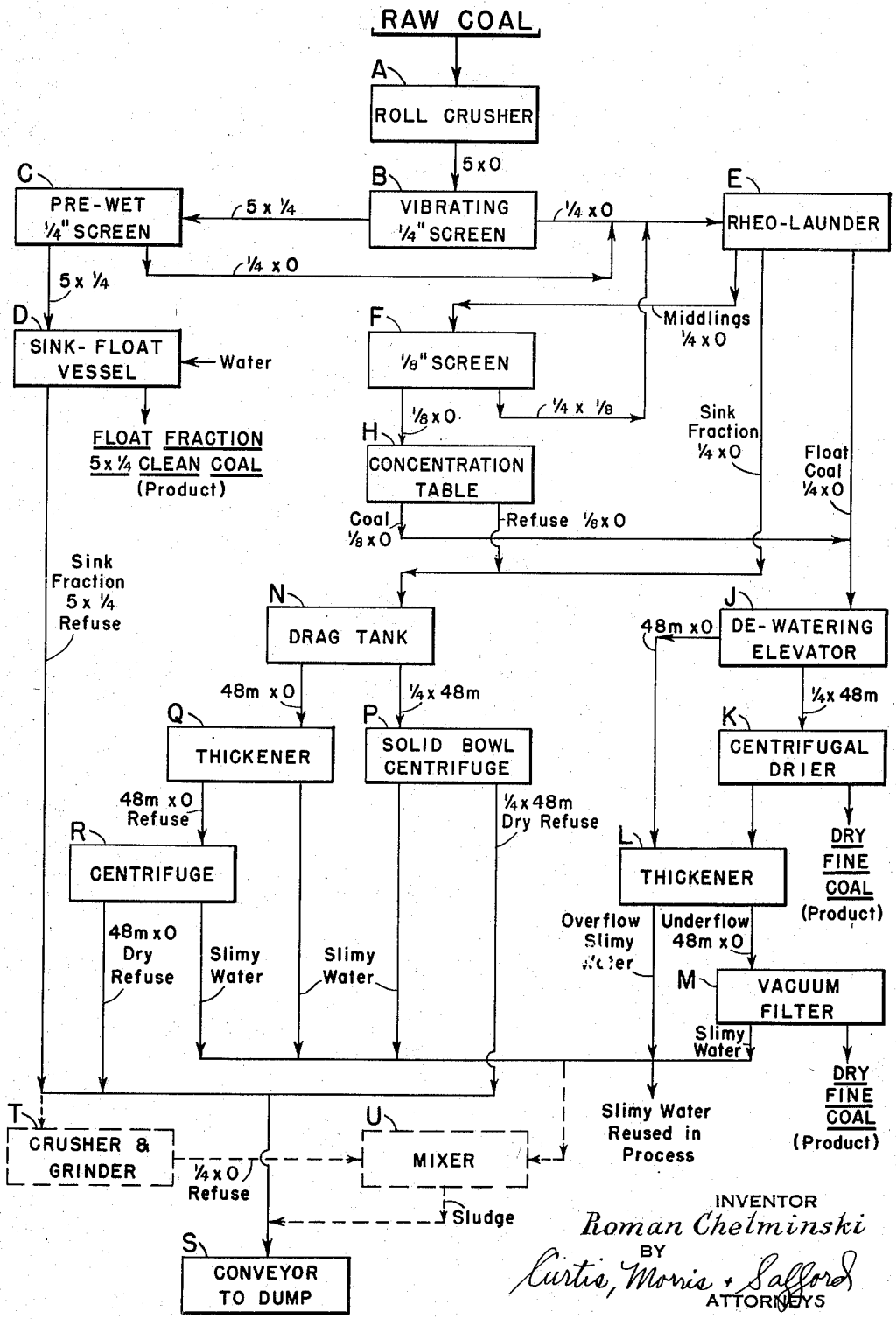

2,656,118

UNITED STATES PATENT OFFICE 2,656,118

DISPOSAL OF SLIME-BEARING WATER

Roman Chelminski, Wilton, Conn., assignor to Knowles Associates, New York, N. Y., a copartnership Application March 24, 1951, Serial No. 217,388

11 Claims. (Cl. 241—24)

This invention relates to the cleaning of coal, and more particularly to a novel method of disposing of slime-bearing water that is produced as an incident of conventional coal-cleaning processes.

In conventional coal-cleaning processes the raw coal is initially crushed and screened to produce two or more fractions of different particle sizes. These fractions are then treated substantially independently by various hydraulic separating and washing procedures that are analogous to hydrometallurgical operations to separate refuse from the coal. Although these procedures are not strictly speaking metallurgical, they are referred to herein for convenience as hydrometallurgical operations. A considerable quantity of water is required to carry out the hydrometallurgical operation and it is customary in a coal-cleaning plant to re-use this water with fresh water being added in such amounts as are required to compensate for water leaving the plant with the product coal and discarded refuse.

As an incident of the coal-cleaning process, a certain amount of very fine material, which may be either present in the materials fed to the process or produced in the course of the process, becomes suspended in the process water as a slime and is not readily separable therefrom by the usual separation techniques such as filtration, centrifugation and settling. Normally the slime is composed essentially of refuse or high ash coal, although in cases where an exceptionally friable coal is being processed, it may contain a significant amount of coal. The product coal and discarded refuse leaving the plant carry with them a certain amount of water containing slimes, and hence with recirculation of the process water the plant achieves an equilibrium condition characterized by the fact that the slime-forming material in the feed to the plant plus that produced by degradation within the plant equals the slime content of the water entrained with the various products discharged from the plant. It has been found that at this equilibrium condition the slime content of the water reaches an undesirably high value which may be as much as 20–30 percent by weight or more. This is an excessively dirty water for operation of a coal preparation plant because of the fact that the hydrometallurgical processes that are carried out, e. g. Rheolaveur, tabling, classification, de-watering and thickening, are all rendered less efficient by the employment of water containing too large a percentage of solids, since the separating efficiency of these processes depends largely upon accurate control of the densities of aqueous suspensions of various process materials.

It is of course possible to reduce the slime content of the process water by increasing the supply of fresh water and withdrawing slime-bearing water from the process eitiher intermittently or continuously. However if the plant is operated in this manner, the disposal of the removed slime-bearing water presents a serious problem. The slimy water cannot be put in rivers and streams because it would pollute them. Pumping the slime to refuse piles or dumps is unsatisfactory because the slimy material soon forms an impervious blanket through which no further percolation will take place. Pumping the slime to pounds for disposal is expensive and also presents the danger of pollution of streams unless very large settling areas are provided. Such settling areas have high maintenance costs because the ponds rapidly fill up and the slimy solids must be periodically dug out.

It is accordingly an object of the present invention to provide a novel method of disposing of slime-bearing water from a coal preparation plant. It is another object of the invention to provide a method of disposing of such slimy water which avoids the danger of polluting neighboring streams and rivers. It is still another object of the invention to provide a method of slime disposal which renders economically feasible the maintenance of a relatively low slime content in the process water of a coal-cleaning plant. It is a still further object of the invention to provide a method of disposing of the refuse and slimes from a coal cleaning plant that reduces the fire hazard at the tailings pile or refuse dump. Other objects of the invention will in part be obvious and in part pointed out herafter.

The many objects and advantages of the present invention can be best understood and appreciated by referring to the drawing which comprises a flow sheet of a typical coal-separation process. In the drawing certain steps are indicated by dotted lines, which steps comprise a preferred embodiment of the method of the present invention. It is of course to be understood that the flow sheet of the drawing illustrates only one of many known types of coal cleaning processes and that the method of the present invention can be used in conjunction with coal cleaning processes other than that shown in the drawing.

Referring to the drawing, raw coal is initially crushed in the roll crusher A to a maximum size of 5" and then passes to the vibrating ¼" screen B. The designation 5 x 0 on the the flow sheet between roll crusher A and screen B is intended to indicate that the material passing to the screen has a particle size between 0 and 5". The particle size of the various fractions being processed is similarly designated at other points on the flow sheet.

The oversize material from screen B, which has a particle size ranging from 1/4" to 5", is wet with water and then passes to the 1/4" screen C. Oversize material from screen C passes through a sink-float vessel D wherein coal and refuse are hydrometallurgically separated. The float fraction from vessel D is clean coal having a size of 1/4" to 5" and is one of the products of the process. The sink fraction from vessel D is coarse refuse having a size of 1/4" to 5".

The material passing through the screens B and C is combined and sent, with a predetermined flow of water to a Rheo-launder E. The material fed to the Rheo-launder E is hydrometallurgically separated therein into three fractions, a float fraction, a sink fraction and a middle fraction. The middle fraction or "middlings" passes to a 1/8" screen F. Oversize material from screen F having a particle size of 1/8" to 1/4" is combined with the feed to Rheo-launder E. The material passing through screen F is fed to a concentration table H wherein a separation betwen coal and refuse takes place. The coal fraction from concentration table H having a particle size of 0 to 1/8" is combined with the float fraction from Rheo-launder E and sent to a de-watering elevator J wherein the material is separated into two fractions having particle sizes respectively greater than and less than 48 mesh.

The 48 mesh to 1/4" material from the de-watering elevator J passes to a centrifugal drier K wherein a solid and liquid phase are separated. The solid phase is relatively water-free, fine coal and is one of the products of the process.

The overflow from de-watering elevator J which contains particles of less than 48 mesh size and the liquid phase from centrifugal drier K, which contains only relatively small particles, are both fed to a thickener L. The underflow from thickener L goes to a vacuum filter M from which a filter cake is discharged that is relatively water-free coal. The coal discharged from filter M is somewhat finer than the coal discharged from drier K and is similarly one of the products of the process.

The overflow from thickener L and the filtrate of filter M are slimy water, the disposition of which will be described hereafter.

Reverting now to Rheo-launder E, the sink fraction from the Rheo-launder having a particle size of 0 to 1/4" is combined with the 0 to 1/8" refuse from concentration table H and fed to a drag tank N, wherein the feed material is separated into two fractions having particle sizes respectively greater than and less than 48 mesh. The fraction containing the larger particles passes to a solid bowl centrifuge P from which 48 mesh to 1/4" relatively dry refuse is discharged. The liquid phase from centrifuge P is slimy water.

The fraction from drag tank N having the smaller size particles is fed to a thickener Q from which the underflow passes through a centrifuge R wherein a solid and liquid phase are separated. The overflow of thickener Q and the liquid phase from centrifuge R are both slimy water.

The solid phase from centrifuge R is relatively dry refuse which is normally combined with the refuse from sink-float vessel D and from centrifuge P and charged to a conveyor S which carries the refuse to a tailings pile or dump.

The flows of slimy water from centrifuge R, thickener Q, centrifuge P, thickener L and filter M are normally combined and re-used. The recirculated water is introduced at numerous different places in the process, but since this re-use of the process water is conventional the points of introduction of the water have not been indicated on the drawing. It may be noted that coal which is to be used for metallurgical purposes is usually subjected to further refining steps of the same general character as those described above.

As previously indicated, if all of the slimy water from the five sources indicated on the flow sheet is recirculated for re-use in the process there is a tendency for the solids content of the water to build up excessively. To prevent this undesired build-up of solids in the water, it is desirable that a proportion of the slimy water be removed from the process and disposed of. The amount of slimy water withdrawn should be such as to establish an equilibrium condition of the type previously referred to, characterized by the fact that the process water has a slime content low enough to produce satisfactory operation of the hydrometallurgical equipment. In accordance with the preferred embodiment of the present method here being described, this withdrawn slimy water can be disposed of as follows:

The sink fraction from the sink-float vessel D is composed of refuse having a particle size of 1/4" to 5". Some or all of this refuse is fed to a crusher T wherein it is reduced to a particle size of 0 to 1". In the mixer U the crushed, coarse refuse is mixed with slimy water from any or all of the sources described above and since the surface area of the refuse has been substantially increased by the crushing and grinding operation, the refuse and water mix to form a thick sludge. This sludge is put onto the conveyor S and conveyed thereby to the tailings pile or dump.

In general, the crushing and grinding of the coarse refuse should be carried to the point at which the increase in surface area of the crushed refuse is sufficient to cause the mixture of slimy water and crushed refuse to form a substantially non-flowable non-draining mass or sludge. The extent to which the crushing must be carried to achieve this result varies somewhat with the nature of the refuse. However, the maximum particle size should not exceed about 1". In cases where the refuse is a relatively friable material, it has been found that crushing to a maximum size of about 4-mesh is satisfactory and preferable, since under these circumstances a large proportion of the particles are substantially smaller than 4-mesh. On the other hand, if the refuse is relatively hard it may be necessary to crush to a smaller maximum particle size in order to secure the desired increase in surface area. In general the preferred range of maximum particle sizes is about 4-mesh to 65-mesh, it being understood that a considerable fraction of the crusher discharge will be much finer.

It is of course to be understood that the foregoing description is intended to be illustrative only and numerous changes may be made within the scope of the invention. For example, in the flow sheet the slimy water from various sources is combined before being fed to the mixer U, but it is apparent that under certain circumstances it may be desirable to feed water to the mixer from only one of the five sources shown or to combine the water from two or more of these sources as a feed to the mixer. The slimy water from different sources may contain varying amounts of coal and in general it is desirable to withdraw from the process for disposal those slimy water fractions that contain the least amount of coal. It is also possible to use the underflow from thickener Q as feed to the mixer and eliminate centrifuge R from the system.

Under certain circumstances the crushing and mixing steps can be advantageously combined. For example, if the crusher T is of the travelling breaker plate hammer mill type the slimy water may be mixed with the crushed refuse in the crusher and the mixer U eliminated. As a further modification the coarse refuse can be crushed to a relatively coarse size e. g. 1", screened, and the finer fraction from the screening operation mixed with the slimy water to form a slurry or sludge which can then be mixed with the oversize material from the screen to form the sludge that is conveyed to the tailings pile. Other modifications of the crushing and mixing steps will suggest themselves to those skilled in the art.

It is not essential that the slimy water be mixed with crushed coarse refuse. If desired, the water can be mixed with any inert particulate solid material provided that such material has a sufficient surface area to form a sludge of the desired consistency. For example, sand or fly ash might be used. Also as previously indicated, where an exceptionally friable coal is being processed, the slime may contain a significant amount of coal and under such circumstances it may be desirable to mix the slimy water with fine coal to form a sludge having a coal content that could be employed for a useful purpose. The finer refuse from centrifuges P and R can also be mixed with the slimy water, although these materials normally have such a high water content that their use for the purposes of the present invention is not particularly advantageous. Other modifications within the scope of the invention will occur to those skilled in the art.

While the various alternative materials indicated above can be used to form a sludge with the slimy water, it has been found that the use of crushed coarse refuse presents a number of unique advantages. Thus, it has been found that the coarse refuse can be readily crushed at relatively low cost to produce a material having an unexpectedly high absorption for the slimy water. For example, it was found that when a typical coarse refuse was crushed to a maximum size of 4-mesh the particle size distribution of the resulting material was such that the process water could be mixed therewith to 22% by weight to form a substantially non-flowable mass. More generally the coarse refuse, when crushed to any maximum size within the range recited above, i. e. 4 to 65 mesh, appears to have an exceptionally high absorptive capacity for the slimy water.

I claim:

1. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, intimately mixing such slime-bearing water with an inert particulate solid material in the proper proportions to form a substantially non-flowable and non-draining mass, and conveying said mass to a point of disposal.

2. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, intimately mixing such slime-bearing water with an inert particulate solid material having a particle size no greater than 1" in the proportions required to form a substantially non-flowable mass and conveying said mass to a point of disposal.

3. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, intimately mixing such slime-bearing water with an inert particulate solid material having a maximum particle size between 4 and 65 mesh in the proportions required to form a substantially non-flowable mass, and conveying said mass to a point of disposal.

4. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, mechanically reducing the particle size of a quantity of said coarse refuse to increase substantially the total surface area of said quantity of refuse, intimately mixing said quantity of refuse with such slime-bearing water in the proportions required to form a substantially non-flowing sludge, and conveying said sludge to a point of disposal.

5. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, crushing and grinding a quantity of said coarse refuse to increase substantially the total surface area of said quantity of refuse, intimately mixing said quantity of refuse with such slime-bearing water in the proper propotrions to form a substantially non-flowing sludge, and conveying said sludge to a point of disposal.

6. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, mechanically reducing said coarse refuse to a material having a particle size no greater than 1", intimately mixing said material with such slime-bearing water in the proportions required to form a substantially non-flowing sludge, and conveying said sludge to a point of disposal.

7. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, mechanically reducing said coarse refuse to a material having a maximum particle size between 4 and 65 mesh, intimately mixing said material with such slime-bearing water in the proper proportions to form a substantially non-flowing sludge, and conveying said sludge to a point of disposal.

8. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, crushing and grinding said coarse refuse to produce a material having a maximum particle size between 4 and 65 mesh, intimately mixing said material with such slime-bearing water in the proportions required to form a substantially non-flowing sludge, and conveying said sludge to a point of disposal.

9. In a process for cleaning coal which includes hydrometallurgically separating relatively coarse and relatively fine refuse therefrom, whereby a portion of the fine refuse becomes suspended as a slime in the water used in processing the coal, the method of disposing of the slime-bearing water which comprises, crushing and grinding a quantity of said coarse refuse and simultaneously mixing therewith such slime-bearing water in the proper proportions to form a substantially non-flowing sludge, and conveying said sludge to a point of disposal.

10. In a process for cleaning coal which includes hydrometallurgically separating relatively coarse refuse and relatively fine refuse therefrom, whereby a portion of the fine refuse becomes suspended as a slime in the water used in processing the coal, the method of disposing of the slime bearing water which comprises, crushing and grinding a quantity of said coarse refuse to increase substantially the total surface area of said quantity of refuse, thereafter mixing said quantity of refuse with such slime-bearing water in the proportions required to form a substantially non-flowing sludge, and conveying said sludge to a point of disposal.

11. In a process for cleaning coal which includes hydrometallurgically separating relatively coarse refuse and relatively fine refuse therefrom, whereby a portion of the fine refuse becomes suspended as a slime in the water used in processing the coal, the method of disposing on the slime-bearing water which comprises, crushing a quantity of said coarse refuse to a particle size no greater than about 1", screening the crushed refuse, intimately mixing the finer fraction from the screening operation with such slime-bearing water, thereafter combining the mixture of finer refuse and such slime-bearing water with the oversize material from said screening operation to form a non-flowable sludge, and conveying said sludge to a point of disposal.

ROMAN CHELMINSKI.

References Cited in the file of this patent

UNITED STATES PATENTS

| Number | Name | Date |
|---|---|---|
| 387,588 | Gostling | Aug. 7, 1888 |
| 616,831 | Elliott | Dec. 27, 1898 |
| 770,778 | Patterson | Sept. 27, 1904 |
| 915,260 | Wilkinson | Mar. 16, 1909 |
| 924,682 | Maignen | June 15, 1909 |
| 948,074 | Patterson | Feb. 1, 1910 |
| 1,201,143 | Burks et al. | Oct. 19, 1916 |
| 1,781,314 | Brandt | Nov. 11, 1930 |
| 1,795,603 | Hussey | Mar. 10, 1931 |
| 1,956,293 | Klein | Apr. 24, 1934 |
| 2,241,143 | Kuster | May 6, 1941 |

OTHER REFERENCES

Taggart: Handbook of Mineral Dressing, J. Wiley & Sons, Inc., New York 1945. (Copy in Div. 25.) Section 20, pages 16 and 40; section 3, pages 34 and 35; section 16, page 18; section 4, page 94.